(12) United States Patent
Davis

(10) Patent No.: US 10,142,924 B2
(45) Date of Patent: *Nov. 27, 2018

(54) METHOD AND APPARATUS FOR GENERATING RECOMMENDED CHANGES TO COMMUNICATION BEHAVIORS

(71) Applicant: AT&T Intellectual Property I, L.P., Atlanta, GA (US)

(72) Inventor: Braxton K. Davis, Atlanta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 50 days.

This patent is subject to a terminal disclaimer.

(21) Appl. No.: 15/269,047

(22) Filed: Sep. 19, 2016

(65) Prior Publication Data

US 2017/0006537 A1    Jan. 5, 2017

Related U.S. Application Data

(63) Continuation of application No. 13/534,929, filed on Jun. 27, 2012, now Pat. No. 9,451,539.

(51) Int. Cl.
   *H04W 48/18* (2009.01)
   *H04L 12/58* (2006.01)
   *H04L 29/08* (2006.01)

(52) U.S. Cl.
   CPC ............. *H04W 48/18* (2013.01); *H04L 51/32* (2013.01); *H04L 67/22* (2013.01)

(58) Field of Classification Search
   CPC .......... H04W 48/18; H04L 67/22; H04L 51/32
   See application file for complete search history.

(56) References Cited

U.S. PATENT DOCUMENTS

| | | | |
|---|---|---|---|
| 6,650,739 B1 * | 11/2003 | Doeberl | H04M 1/72547 379/201.01 |
| 7,269,432 B2 * | 9/2007 | Gress | H04L 51/066 455/414.1 |
| 7,529,741 B2 * | 5/2009 | Aravamudan | G06F 17/30035 |
| 7,870,264 B2 * | 1/2011 | Clark | H04L 67/24 709/224 |
| 7,984,106 B2 * | 7/2011 | Facemire | G06Q 10/00 709/206 |
| 8,078,677 B2 * | 12/2011 | Mendiola | H04L 63/104 707/781 |
| 8,335,798 B2 * | 12/2012 | Achlioptas | G06F 17/30867 707/785 |

(Continued)

FOREIGN PATENT DOCUMENTS

| CA | 2670518 A1 * | 6/2008 | .......... H04L 51/066 |
|---|---|---|---|
| JP | 2003115888 | 4/2003 | |

(Continued)

*Primary Examiner* — Uzma Alam

(57) ABSTRACT

In one embodiment, a method for generating a recommended change to a communication behavior of a first user of a network includes identifying a communication pattern in accordance with data extracted from communications collected in the network, wherein the data is associated with at least one of the first user and an endpoint other than the first user, and generating the recommended change based on the communication pattern, where the recommended change is to the communication behavior of the first user.

20 Claims, 3 Drawing Sheets

(56) References Cited

U.S. PATENT DOCUMENTS

| | | | | |
|---|---|---|---|---|
| 8,588,859 | B2* | 11/2013 | Kim | H04M 1/72544 455/550.1 |
| 8,782,121 | B1* | 7/2014 | Chang | H04L 67/104 709/202 |
| 2002/0178161 | A1* | 11/2002 | Brezin | G06F 17/30867 |
| 2003/0050979 | A1* | 3/2003 | Takahashi | G06Q 30/02 709/204 |
| 2003/0216986 | A1* | 11/2003 | Hassan | G06Q 10/10 705/35 |
| 2005/0021750 | A1* | 1/2005 | Abrams | G06Q 10/10 709/225 |
| 2005/0210102 | A1* | 9/2005 | Johnson | G06Q 30/02 709/204 |
| 2006/0215694 | A1 | 9/2006 | Lu | |
| 2007/0223463 | A1* | 9/2007 | Weinberger | H04L 51/36 370/356 |
| 2007/0265857 | A1* | 11/2007 | Shivaji Rao | H04N 7/165 709/231 |
| 2008/0040673 | A1* | 2/2008 | Zuckerberg | G06F 17/30867 715/745 |
| 2008/0215694 | A1* | 9/2008 | Chen | H04L 51/066 709/206 |
| 2009/0055523 | A1* | 2/2009 | Song | H04L 67/22 709/224 |
| 2009/0083116 | A1* | 3/2009 | Svendsen | G06F 17/30743 709/217 |
| 2009/0172127 | A1* | 7/2009 | Srikanth | G06Q 30/00 709/217 |
| 2009/0307345 | A1* | 12/2009 | Carter | G06Q 30/02 709/224 |
| 2010/0057675 | A1* | 3/2010 | White | G06Q 30/02 707/E17.108 |
| 2010/0082801 | A1* | 4/2010 | Patel | G06F 15/16 709/224 |
| 2010/0169789 | A1* | 7/2010 | Cheng | G06Q 30/00 715/738 |
| 2010/0325470 | A1* | 12/2010 | Underwood | H04W 4/14 714/2 |
| 2011/0137776 | A1* | 6/2011 | Goad | G06Q 20/102 705/34 |
| 2011/0154208 | A1* | 6/2011 | Horii | H04L 67/22 715/736 |
| 2011/0208868 | A1* | 8/2011 | Walsh | H04W 4/023 709/227 |
| 2012/0060120 | A1* | 3/2012 | Aravamudan | G06F 17/30035 715/811 |
| 2012/0135723 | A1* | 5/2012 | Ramo | G06F 17/30867 455/418 |
| 2012/0173383 | A1* | 7/2012 | Badawiyeh | G06Q 30/0631 705/26.7 |
| 2012/0192086 | A1* | 7/2012 | Ghods | G06Q 10/10 715/753 |
| 2012/0259675 | A1* | 10/2012 | Roehrs | G06Q 30/02 705/7.29 |
| 2012/0278428 | A1* | 11/2012 | Harrison | H04N 21/2665 709/217 |
| 2012/0296919 | A1* | 11/2012 | Sinha | H04L 67/22 707/749 |
| 2013/0073989 | A1* | 3/2013 | Harris | G06Q 10/10 715/758 |
| 2013/0254217 | A1* | 9/2013 | Xu | G06F 17/30699 707/754 |
| 2013/0290820 | A1* | 10/2013 | Dhanani | G06Q 50/01 715/205 |
| 2013/0304822 | A1* | 11/2013 | Tetreault | H04N 21/2187 709/204 |
| 2013/0325858 | A1* | 12/2013 | Xu | G06F 17/30867 707/730 |
| 2014/0129942 | A1* | 5/2014 | Rathod | H04N 21/44222 715/720 |

FOREIGN PATENT DOCUMENTS

| | | | | |
|---|---|---|---|---|
| JP | | 2003115888 A | * | 4/2003 |
| WO | WO | 2008067654 | | 6/2008 |
| WO | WO-2008067654 | A1 | * | 6/2008 ........... H04L 51/066 |
| WO | WO | 2013067365 | | 5/2013 |
| WO | WO-2013067365 | A1 | * | 5/2013 ........... H04L 65/403 |

* cited by examiner

METHOD AND APPARATUS FOR GENERATING RECOMMENDED CHANGES TO COMMUNICATION BEHAVIORS

This application is a continuation of U.S. patent application Ser. No. 13/534,929, filed Jun. 27, 2012, now U.S. Pat. No. 9,451,539, which is herein incorporated by reference in its entirety.

FIELD OF THE DISCLOSURE

The present disclosure relates generally to network communications and relates more particularly to techniques for generating recommended changes to communication behaviors.

With the proliferation of mobile communications and social media, it is often difficult to determine the best way in which to contact a given person. For instance, that person may own multiple mobile communications devices (e.g., a cellular phone, a tablet computer, a portable gaming device, etc.) and/or multiple social media accounts (e.g., social networking accounts, blogging and microblogging accounts, personal web sites, etc.). The person may favor certain ones of these devices and/or accounts for communicating, but such preferences may not be known to someone trying to reach him.

In addition, users of mobile communications devices often fail to use their devices and associated services in the most cost efficient manner. For instance, many users of mobile communications devices choose their devices, service plans, or service providers based on the amount of air time or data that they expect to consume. However, analysis of other metrics (such as the people with whom the users most frequently communicate) might ultimately identify a more cost effective alternative.

SUMMARY

In one embodiment, a method for generating a recommended change to a communication behavior of a first user of a network includes identifying a communication pattern in accordance with data extracted from communications collected in the network, wherein the data is associated with at least one of the first user and an endpoint other than the first user, and generating the recommended change based on the communication pattern, where the recommended change is to the communication behavior of the first user.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for generating suggested changes to communication behaviors. Embodiments of the disclosure aggregate data extracted from network communications in order to identify patterns of use. These patterns of use in turn are used to generate recommendations intended to help a user communicate more efficiently (e.g., in a manner that reduces the time and/or cost necessary to communicate with another endpoint—e.g., another user, service, or application).

Figure 1:
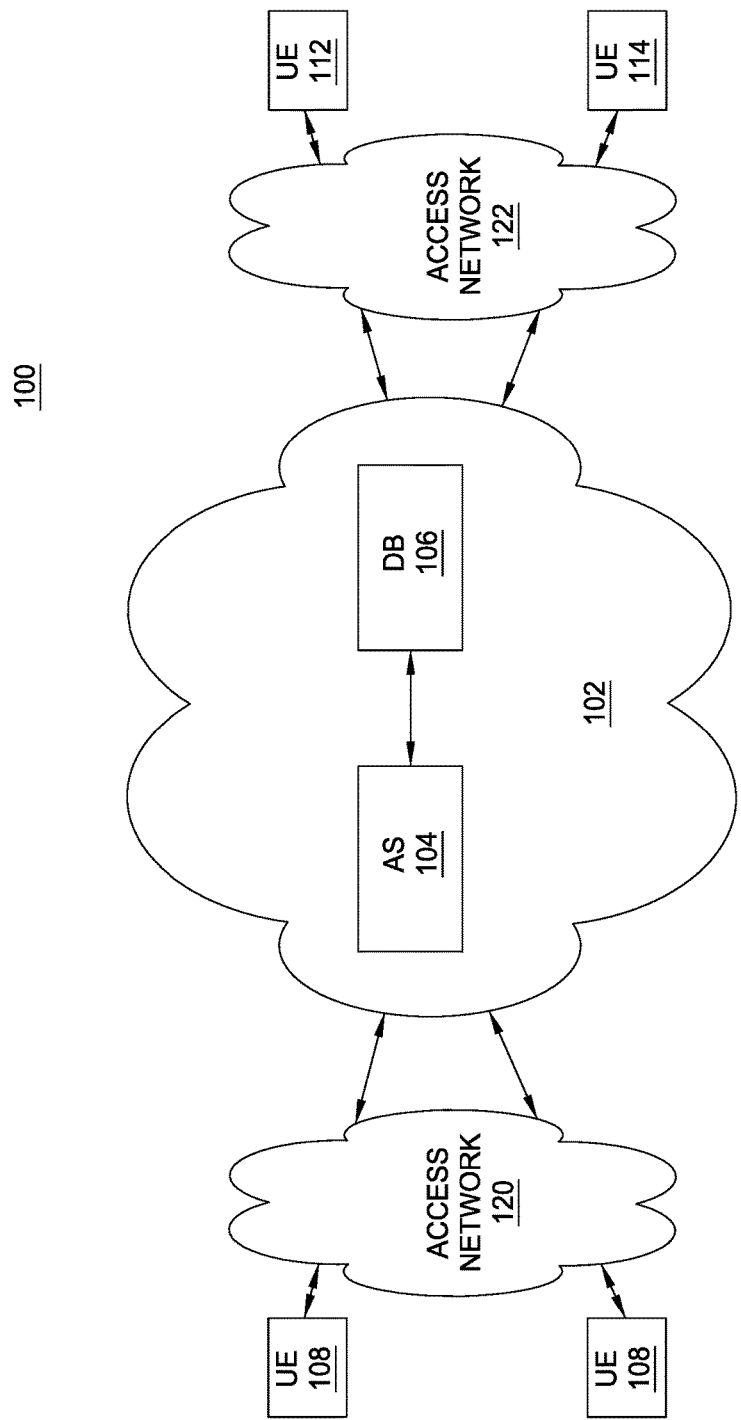
FIG. 1 is a block diagram illustrating an exemplary packet network, configured according to embodiments of the current disclosure.

FIG. 1 is a block diagram depicting one example of a communications network 100. The communications network 100 may be any type of communications network, such as for example, a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 3:
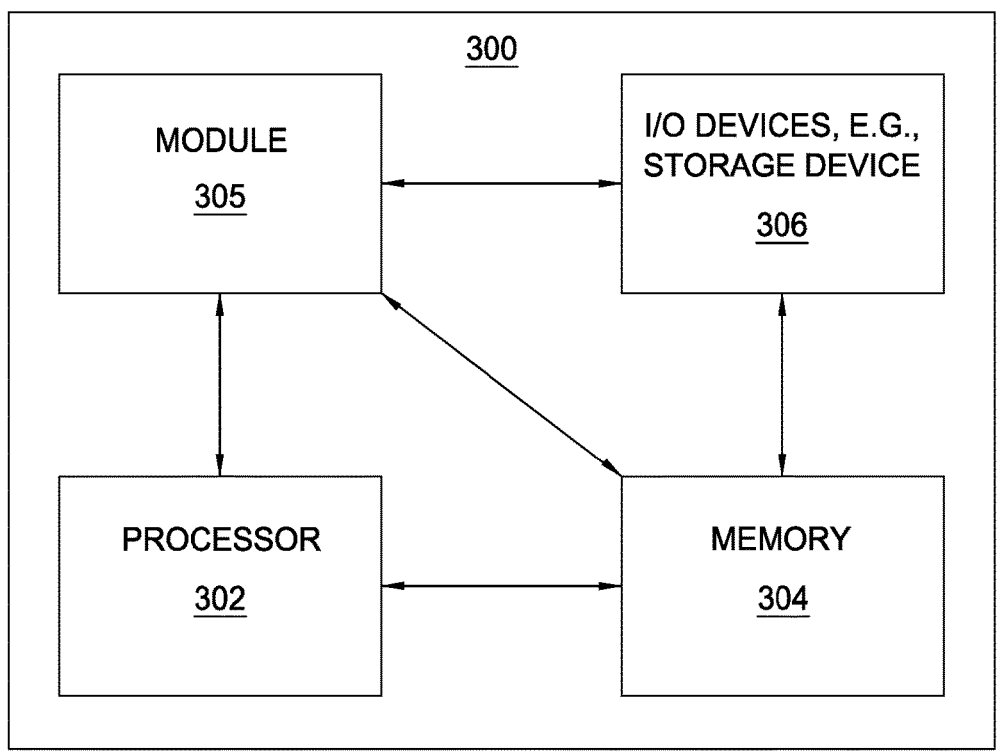
FIG. 3 is a high level block diagram of the change suggestion method that is implemented using a general purpose computing device.

In one embodiment, the AS 104 may comprise a general purpose computer as illustrated in FIG. 3 and discussed below. In one embodiment, the AS 104 may perform the methods and algorithms discussed below related to improving the efficiency of network communications.

In one embodiment, the DB 106 may store contact information for users of the network 100. For example, the DB 106 may store cellular telephone numbers, email addresses, social media profiles, and the like for each user. In addition, the DB may store information relating to services to which the user is subscribed, including cellular telephone services, Internet services, gaming subscriptions, and social media services.

In one embodiment, the DB 106 may store various data and metrics extracted from network communications. For example, as data is extracted from the network communications, the data may be stored in the DB 106. The data may include information such as other endpoints (e.g., users, applications, or services) with whom a user most frequently communicates, how much time a user spends using certain devices or social media accounts, how quick a user is to respond to communications received via certain devices or social media accounts, or the like. The data may then be aggregated and analyzed in order to improve the efficiency of users' network communications.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device such as a desktop computer or a mobile endpoint device such as a cellular telephone, a smart phone, a tablet computer, a laptop computer, a netbook, an ultrabook, a tablet computer, a portable media device (e.g., an MP3 player), a gaming console, a portable gaming device, and the like. It should be noted that although only four user endpoint devices are illustrated in FIG. 1, any number of user endpoint devices may be deployed.

It should be noted that the network 100 has been simplified. For example, the network 100 may include other network elements (not shown) such as border elements, routers, switches, policy servers, security devices, a content distribution network (CDN) and the like.

Figure 2:
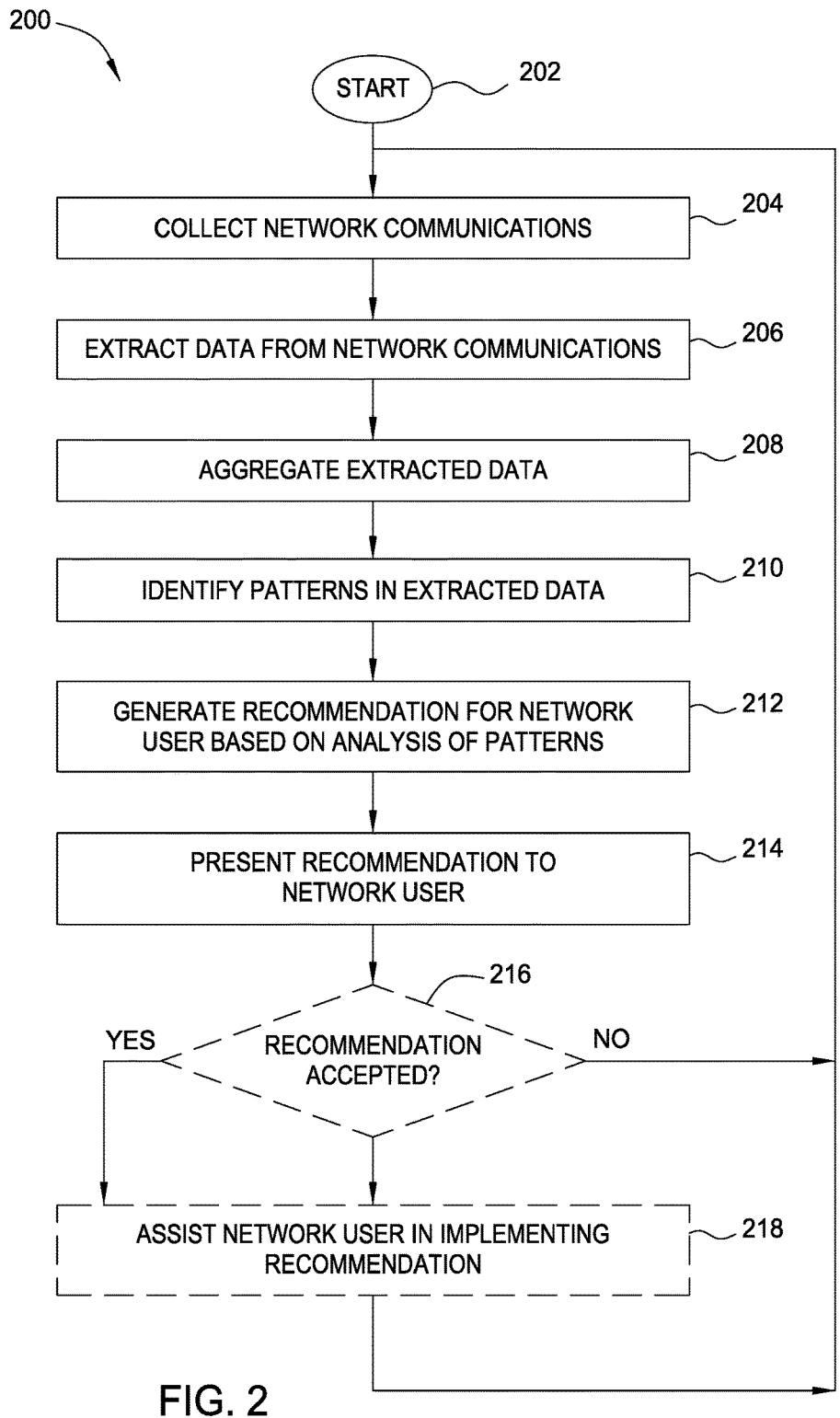
FIG. 2 illustrates a flowchart of a method for generating a suggested change to a user's communication behaviors.

FIG. 2 illustrates a flowchart of a method 200 for generating a suggested change to a user's communication behaviors. In particular, the method 200 generates recommendations that may aid a user in improving the efficiency of his communications if adopted. In one embodiment, the method 200 may be performed by the AS 104 or a general purpose computing device as illustrated in FIG. 3 and discussed below.

The method 200 begins at step 202. At step 204, the application server 104 collects network communications. The network communications may include, for example, calls made on a cellular, IP, or circuit-switched network, a short message service (SMS) message, a multimedia message service (MMS) message, an instant message (IM), an email, a social media post or entry (e.g., a blog entry or a message sent to another person via a social networking application), or the like.

At step 206, application server 104 extracts data from the network communications. In one embodiment, the extracted data comprises metadata relating to the network communications. The metadata might include, for a given network communication, one or more of the following: the sender of the network communication, the recipient of the network communication, the means by which the network communication was sent (e.g., the devices, services, and/or networks used), or the duration of the network communication. In one embodiment, the data does not include the content of the network communication, in order to protect the privacy of the users.

At step 208, the application server 104 aggregates the extracted data. In one embodiment, the aggregation step involves combining various data extracted from multiple sources (e.g., multiple different user endpoint devices and/or other network devices) in order to generate summary statistics. At step 210, the application server 104 identifies communication patterns in accordance with the aggregated data. For instance, the communication patterns may help to detect the frequency analytics and durations of the network communications. The frequency analytics and durations may in turn help to identify more specific patterns. In one embodiment, the more specific patterns relate to the frequency and/or duration of a particular network user's communications with in-network and out-of-network contacts. In another embodiment, the more specific patterns relate to the specific contacts with whom the particular network user communicates most frequently or for the greatest amount of time (e.g., average duration of calls or collective duration of all calls). In another embodiment, the more specific patterns relate to the virtual or live groups or networks with whom the particular network user communicates most frequently or for the greatest amount of time. In another embodiment, the more specific patterns relate to the modes of communication (e.g., particular devices or accounts) via which a particular network user is most responsive or to which a particular network user responds most quickly. In a further embodiment, the specific patterns may identify particular times of day associated with a particular network user's responsiveness to a given mode of communication. In a further embodiment still, the more specific patterns relate to applications or services with which a particular network user most frequently interacts (e.g., social networking web sites, media streaming services, etc.).

At step 212, the application server 104 generates a recommendation for a particular network user, based on an analysis of the patterns identified in step 210. For example, the recommendation may involve suggesting that the particular network user change service providers, join a particular social media group or network, or subscribe to a particular service. In another embodiment, the recommendation may involve suggesting a particular mode of communication (e.g., particular device or account) by which to communicate with a given contact at a given time. In one embodiment, the recommendation is generated in response to some triggering event. The triggering event may be a periodic event, such as the close of a service billing cycle or the start of a new month. Alternatively, the triggering event may be a one-time event, such as the initiation of a call to another user.

At step 214, the application server 104 presents the recommendation to the particular network user. In one embodiment, the recommendation includes supporting data such as statistical data on which the recommendation is based. For instance, if the recommendation is a suggestion that the particular network user change switch from cellular service provider A to cellular service provider B based on the fact that the particular network user spends more time communicating with subscribers to cellular service provider B's network, the supporting data might include a tally of the minutes that the particular network user spent in the past month communicating with each service provider's subscribers. In a further embodiment, the recommendation includes any additional data that might be relevant to implementation of the recommendation (e.g., subscription costs, promotions, etc.). In one embodiment, the recommendation is presented to the particular network user via at least one of: SMS, MMS, IM, email, or social network message.

At optional step 216 (illustrated in phantom), the application server 104 receives a selection from the particular network user in response to the recommendation. In one embodiment, the particular network user either accepts the recommendation or declines the recommendation. If the particular network user declines the recommendation, then no further action is necessary. The method 200 may thus return to step 204 and the application server 104 will continue to collect network communications for analysis as described above. However, if the particular network user accepts the recommendation, then the method 200 proceeds to optional step 218.

At optional step 218 (illustrated in phantom), the application server 104 assists the particular network user in implementing the recommendation. For instance, the application server 104 may present (e.g., via any of the user endpoint devices 108-114) the particular network user with an interface that allows the particular network user to subscribe to a recommended service or to send a communication to a particular device. The method 200 then returns to step 204 and the application server 104 will continue to collect network communications for analysis as described above.

As a result, the method 200 helps network users save money and time by promoting efficient and cost effective communications. It also allows network users to visualize and appreciate the potential value of altering their current methods of communicating, without requiring the network users to personally perform in-depth analyses of their communication habits.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Moreover, although certain operations are described as being performed by the application server 104 or by a user endpoint device 108-114, it should be noted that in other embodiments, the operations may be handled differently. For instance, in one embodiment, the user endpoint devices 108-114 may perform all steps of the method 200 with little or no assistance from the application server 104. Alternatively, the application server 104 may perform all steps of the method 200 with little or no assistance from the user endpoint devices 108-114.

As alluded to above, the method 200 may be implemented in a variety of ways to facilitate more efficient network communications. For instance, in one embodiment, the method 200 is implemented to determine the costs associated with an out-of-network user's communications with in-network users. Generally, users of, for example, cellular phone service, are unaware of over which networks they spend most of their time communicating. Thus, the method 200 may determine what the out-of-network user's costs would have been if he had been an in-network user during these communications. If the costs would have been less if he had been an in-network user, the method 200 might suggest that he become an in-network user. The suggestion might further provide promotional rates or other information that would be pertinent to the transition from out-of-network to in-network.

In another embodiment, the method 200 is implemented to determine which contacts should be included within a network user's "calling circle." Calling circles are generally limited in size but allow the users to select the members of the circle with whom the user can communicate at a reduced rate. However, a user may unknowingly spend more time communicating with a contact outside of the circle than with one or more contacts inside the circle. Thus, the method 200 could help the user identify when his calling circle membership should be modified.

In another embodiment, the method 200 is implemented to determine what virtual or live groups a network user should join. In this context, a "virtual group" comprises group of people who socialize and interact online (e.g., in multiplayer games, forums, chat rooms or on social networking sites), but who do not necessarily socialize met offline or in person. A "live group" comprises a group of people who socialize or interact offline or in person (e.g., in social clubs, professional societies, or the like). For instance, the method 200 might determine, based on an analysis of the frequency and duration of the network user's social networking activity, that he spends a lot of time communicating with a plurality of contacts who are all part of the same social networking group. In this case, the method 200 might recommend that the network user join the social networking group in order to communicate more efficiently and more cost effectively with these contacts.

In another embodiment, the method 200 is implemented to determine how a network user can improve his gaming experience. For instance, the method 200 might analyze the launch, duration, and network speeds of multiple games on the same platform. Based on these metrics, the method 200 might recommend to network user that he should log onto the platform or should purchase a game based on inventory and based on what his contacts are playing. Moreover, if there are variances in Internet gaming depending upon which console a network user uses, the method 200 might recommend that the network user use a different console (e.g., the network user most often plays on console X, but most of his contacts play games on console Y).

In another embodiment, the method 200 is implemented to determine services to which a network user should subscribe. For instance, the method 200 might detect that the network user is subscribed to a social networking application but not to a microblogging application. In this case, the method 200 might analyze the amount of time that the network user spends communicating (via all modes of communication) with contacts who are subscribed to this social networking application and this microblogging application, regardless of who initiated the communication. Based on this analysis, the method 200 might recommend that the network user subscribe to the microblogging application in order to communicate more efficiently or cost effectively with his contacts. Further, the recommendation might include information allowing the network user to subscribe to the microblogging application on a trial basis, at a reduced rate, or the like. In a further embodiment still, the method 200 provide analytics on the frequency of use of each mode of communication embedded within the social networking application. This would allow the social networking application to show the network user what percentages of his contacts are also using other specific social media applications, or what percentage of the network user's communications occur over each of the social media applications to which he is subscribed.

In another embodiment, the method 200 is implemented to determine the most efficient or effective way to reach a contact. For instance, a given contact may have several communications devices (e.g., multiple cellular phones for personal and business use, a landline VoIP phone, a tablet computer, etc.) and several social media accounts (e.g., social networking, microblogging, etc.). However, method 200 may determine based on the given contact's communication patterns that she responds more quickly to, for example, text messages sent to her personal cellular phone than to messages sent to her social networking account. The method 200 might also determine that these communication patterns are dependent on the time of day (e.g., the given contact responds most quickly to text messages via personal cellular phone during weekday work hours, but responds most quickly to messages sent via her microblogging account on weekends). In this case, the method 200 might recommend that a network user trying to communicate with this given contact on a Monday afternoon by sending a text message to her personal cellular phone. In a further embodiment, the recommendation might include an estimated response time for messages sent to the given contact via various modes (e.g., various communications devices and social media accounts). In a further embodiment still, the recommendation may account for calendar items recorded in the given contact's calendar application (if she uses one).

In another embodiment, the recommendation generated by the method 200 is a suggestion to change the format of a communication. For instance, communication analytics may indicate that a given contact does not generally answer voice calls on her personal cellular phone during work hours, but responds relatively quickly to text messages during this time. Thus, the recommendation may suggest that a voice message of a network user left for this given contact be converted to a text message. The method 200 may perform this conversion or may employ the assistance of another network device in converting the format of the communication.

FIG. 3 depicts a high-level block diagram of a general-purpose computer suitable for use in performing the functions described herein. The general-purpose computer may be part of the application server 104 or one of the user endpoint devices 108-114 described above. As depicted in FIG. 3, the system 300 comprises a hardware processor element 302 (e.g., a CPU), a memory 304, e.g., random access memory (RAM) and/or read only memory (ROM), a module 305 for generating recommended changes to a user's communication behaviors, and various input/output devices 306, e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 305 for generating recommended changes can be loaded into memory 304 and executed by hardware processor 302 to implement the functions as discussed above. As such, the present module 305 for generating recommended changes as discussed above in method 200 (including associated data structures) of the present disclosure can be stored on a non-transitory (e.g., tangible or physical rather than a propagating signal) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating a recommended change to a communication behavior of a first user of a network, the method comprising:

identifying, by an application server, a communication pattern in accordance with data extracted from communications collected in the network, wherein the data is associated with at least one of the first user and an endpoint other than the first user, wherein the communication pattern identifies a group of users with whom the first user communicates more frequently than the first user communicates with other users, and wherein the group of users includes at least a second user;

generating, by the application server, the recommended change to the communication behavior of the first user based on the communication pattern; and presenting, by the application server, the recommended change to the first user.

2. The method of claim 1, wherein the communication pattern is based at least in part on frequency analytics associated with the communications.

3. The method of claim 1, wherein the communication pattern is based at least in part on durations associated with the communications.

4. The method of claim 1, wherein the communication pattern is based at least in part on a responsiveness of the second user to communications received via a specific communication device.

5. The method of claim 1, wherein the communication pattern is based at least in part on a responsiveness of the second user to communications received via a specific social media application.

6. The method of claim 1, wherein the communication pattern is based at least in part on a responsiveness of the second user to communications received in a specific message format.

7. The method of claim 1, wherein the recommended change suggests that the first user contact the second user via a particular type of communication.

8. The method of claim 1, wherein the recommended change suggests that the first user change a format of a message to be sent to the second user.

9. The method of claim 1, wherein the presenting further comprises:

presenting data supporting the recommended change to the first user, wherein the data supporting the recommended change comprises an aggregated subset of the data extracted from the communications.

10. The method of claim 1, wherein the presenting further comprises:

presenting data pertinent to implementing the recommended change to the first user.

11. The method of claim 1, further comprising:

implementing the recommended change on behalf of the first user.

12. The method of claim 1, wherein the communication pattern identifies another group of users with whom the first user communicates for longer durations than the first user communicates with other users.

13. The method of claim 1, wherein the recommended change suggests that the first user switch from a first service provider to a second service provider.

14. The method of claim 1, wherein the recommended change suggests that the first user subscribe to a service, and wherein the second user subscribes to the service.

15. The method of claim 1, wherein the recommended change suggests that the first user join a virtual group.

16. A non-transitory computer readable medium containing an executable program, which when executed by a processor of an application server, causes the processor to perform operations for generating a recommended change to a communication behavior of a first user of a network, the operations comprising:

identifying a communication pattern in accordance with data extracted from communications collected in the network, wherein the data is associated with at least one of the first user and an endpoint other than the first user, wherein the communication pattern identifies a group of users with whom the first user communicates more frequently than the first user communicates with other users, and wherein the group of users includes at least a second user;

generating the recommended change to the communication behavior of the first user based on the communication pattern; and presenting the recommended change to the first user.

17. A system for generating a recommended change to a communication behavior of a first user of a network, the system comprising:

a processor of an application server; and a non-transitory computer readable medium containing an executable program, which when executed by the processor, causes the processor to perform operations, the operations comprising:

identifying a communication pattern in accordance with data extracted from communications collected in the network, wherein the data is associated with at least one of the first user and an endpoint other than the first user, wherein the communication pattern identifies a group of users with whom the first user communicates more frequently than the first user communicates with other users, and wherein the group of users includes at least a second user;

generating the recommended change to the communication behavior of the first user based on the communication pattern; and presenting the recommended change to the first user.

18. The system of claim 17, wherein the communication pattern is based at least in part on a responsiveness of the second user to communications received via a specific communication device.

19. The system of claim 17, wherein the communication pattern is based at least in part on frequency analytics associated with the communications.

20. The system of claim 17, wherein the communication pattern is based at least in part on durations associated with the communications.

\* \* \* \* \*